Figure 2:
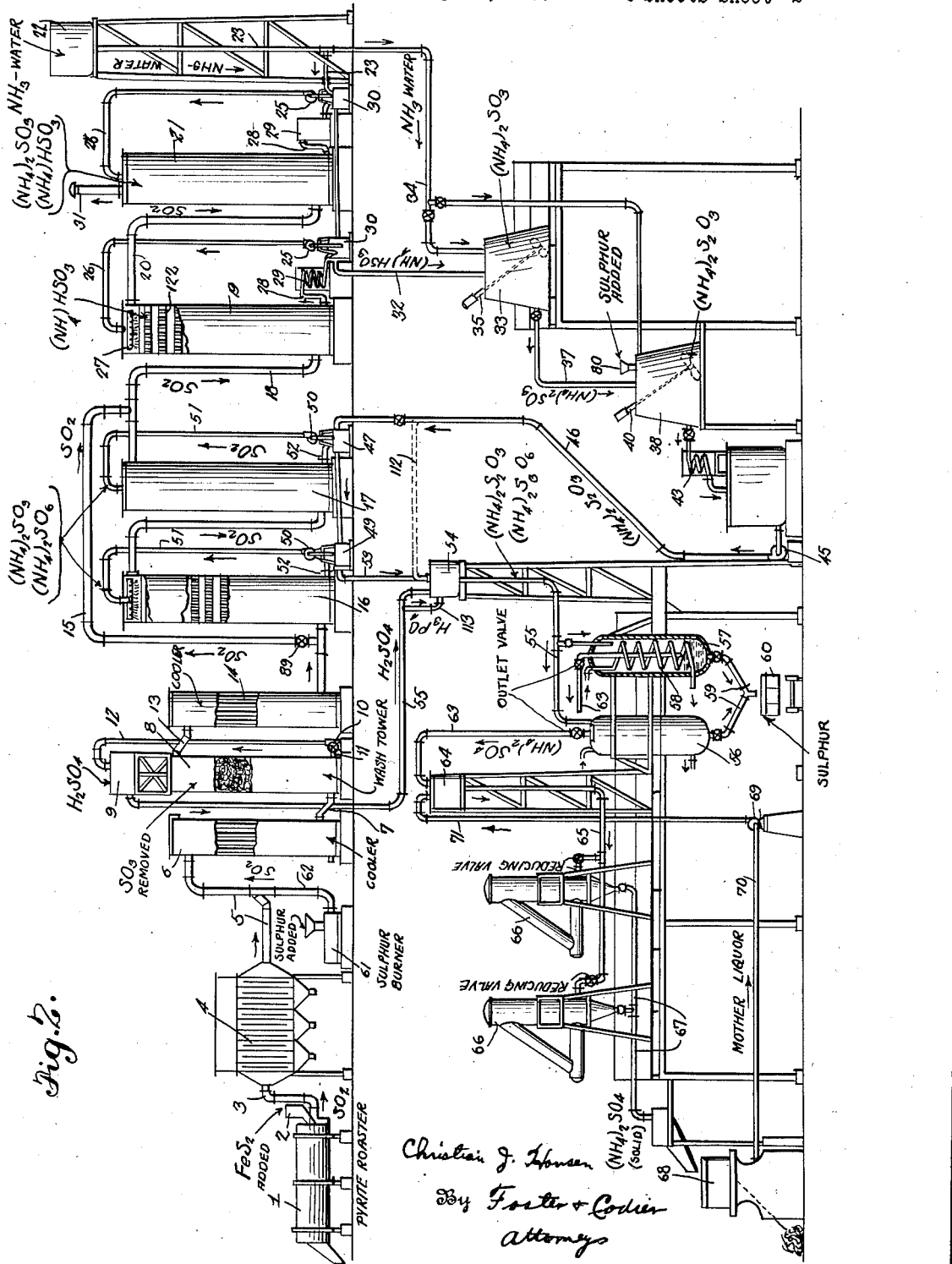

May 29, 1934.  C. J. HANSEN  1,961,104
MANUFACTURE OF FERTILIZER
Filed July 26, 1930  4 Sheets-Sheet 1

Fig. 1.

Christian J. Hansen
By Foster & Corlies
attorneys

May 29, 1934.   C. J. HANSEN   1,961,104
MANUFACTURE OF FERTILIZER
Filed July 26, 1930   4 Sheets-Sheet 4

Patented May 29, 1934

1,961,104

UNITED STATES PATENT OFFICE 1,961,104

MANUFACTURE OF FERTILIZER

Christian Johannes Hansen, Essen, Germany, assignor, by mesne assignments, to The Koppers Company of Delaware, Pittsburgh, Pa., a corporation of Delaware Application July 26, 1930, Serial No. 470,938
In Germany August 7, 1929

8 Claims. (Cl. 71—9)

The present invention relates to a process of preparing fertilizers. It has particular reference to a process of preparing economically, ammonium sulphate and a mixture of ammonium sulphate and ammonium phosphate.

Various methods have been proposed heretofore for converting ammonia, especially synthetic ammonia, into ammonium sulphate by treating the same with sulphurous acid, which for example has been obtained by roasting pyrites, whence ammonium sulphite is formed. The sulphite may then be converted to sulphate according to the following fundamental equation:

$$3SO_2 + 2H_2O = 2H_2SO_4 + S$$

The process has up until now been carried out so that at first ammonium bisulphite is produced out of ammonia and sulphurous acid and then the ammonium bisulphite is converted into a solution of ammonium sulphate and free sulphur by means of heat and pressure. It is wholly immaterial whether one uses catalyzers such as sulphur or selenium in carrying out this reaction. Carrying out such a process on a technical scale has not been feasible previously, since the heat effect accompanying this reaction, particularly in the use of concentrated solution, cannot be controlled. The conversion of ammonium bisulphite to ammonium sulphate takes place very suddenly and under very substantial increase in temperature and pressure which the known converters and technical pressure towers cannot withstand in continuous operation.

A similar disadvantage, as in the case of the conversion of the bisulphite to sulphate, is shown by the well-known process according to which mixtures of ammonium sulphite and ammonium bisulphite which also contain ammonium thiosulphate and ammonium polythionate, are converted by heating into sulphate.

The object of the present invention is to devise a process of preparing ammonium sulphate or ammonium sulphate containing phosphate from ammonia and sulphur dioxide, in which there is first prepared in known manner a solution of ammonium sulphite and ammonium bisulphite from sulphur dioxide or gases containing the same, and ammonia water, which by further treatment with ammonia water is converted into an ammonium sulphite solution and then under the influence of ammonium polysulphide is converted into thiosulphate, whereupon the thiosulphate is converted by means of sulphur dioxide or gases containing the same either wholly or partly into ammonium polythionate, and in such quantity that the obtained ammonium polythionate-thiosulphate solution can be converted by heating under pressure into ammonium sulphate and free sulphur. It has now been found that the conversion of ammonium polythionate or ammonium polythionate-thiosulphate solution to ammonium sulphate and free sulphur has only a very small heat effect and due to this fact the conversion can be carried out in the usual pressure converter in a manner which is fully technically feasible.

The ammonium polysulphide required for the carrying out of this process is obtained, according to the invention, by heating a part of the sulphur resulting from the ammonium polythionate decomposition with ammonia water under pressure; another part of the aforesaid sulphur is added to the ammonium sulphide produced as a result of the reaction between ammonium polysulphide and ammonium sulphite to form ammonium thiosulphate, whereby ammonium polysulphide is formed; and finally, the remainder of the aforesaid sulphur is burned to produce sulphur dioxide.

In order to carry out the process with the smallest possible amount of ammonium polysulphide solution one can, according to the invention, introduce very finely divided sulphur into the ammonium sulphite solution advantageously at a high temperature, whereby a substantial part of the sulphite is converted in a short while to thiosulphate and then the residue of the ammonium sulphite is treated with ammonium polysulphide in the aforementioned manner.

Then it is also possible according to the invention to so prepare thiosulphate, that the ammonium sulphite solution can be suitably treated directly with sulphur in the hot state and the treatment with ammonium polysulphide discarded.

Figure 3:
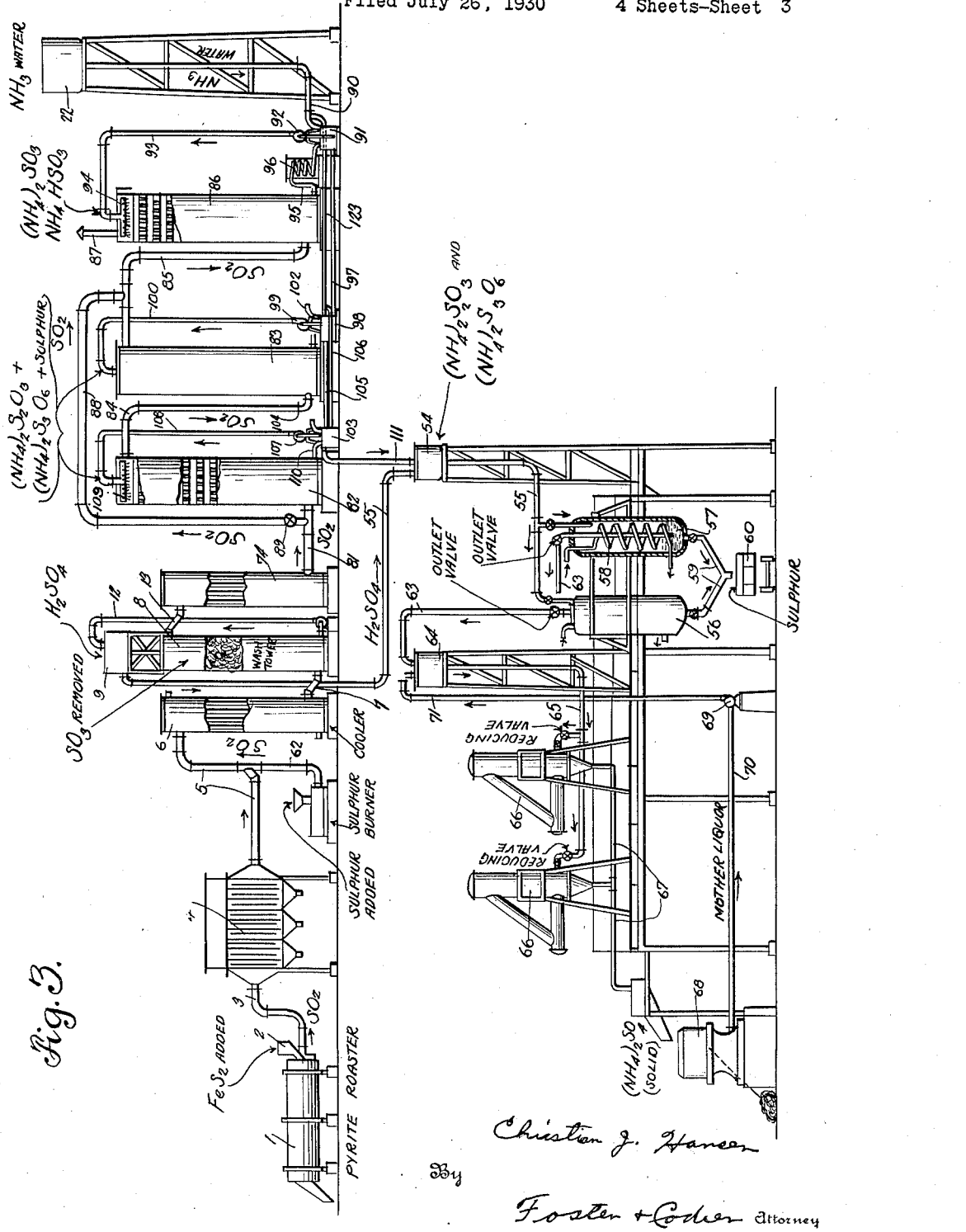
Figure 4:
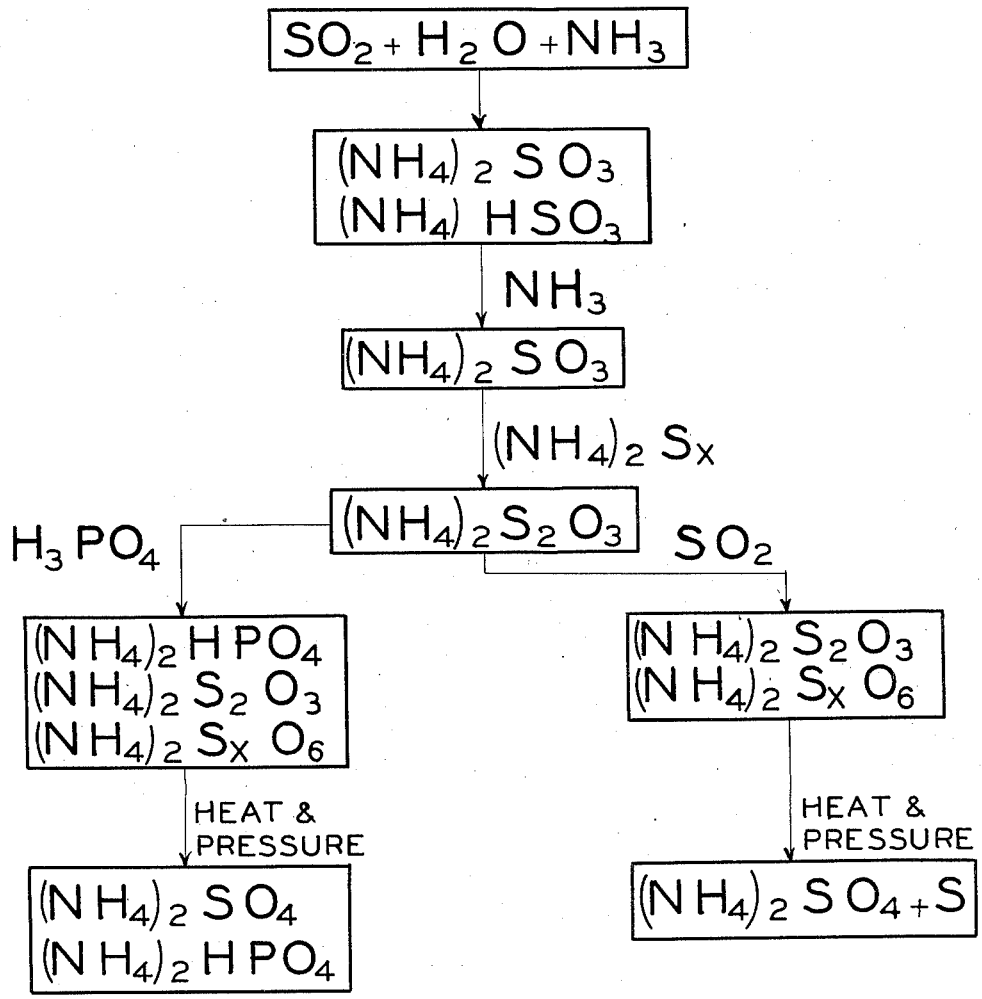

Referring to the drawings, Figure 1 shows a side view of a modification of an apparatus for carrying out the process according to the present invention, a schematic arrangement serving to show the arrangement. Figures 2 and 3 show apparatuses for modified forms of the process according to the present invention. Fig. 4 is a flow sheet.

Finally the process according to the present invention can be used also for obtaining ammonium sulphate and ammonium sulphate containing mixed fertilizers. In the latter case, the treatment of the first obtained thiosulphate solution with sulphurous acid for the purpose of conversion into ammonium polythionate is omitted.

In place of this step, the thiosulphate solution is led into phosphoric acid and this mixture is led directly into the decomposing autoclave, and it has been found that it can be immediately converted by heating into an ammonium sulphate and a solution containing ammonium sulphate and free sulphur.

In the apparatus shown in Figure 1, a part of the sulphur dioxide used is obtained in a chamber 1 in which is burnt in the usual way a sulphur ore, for example pyrites, which is led into the sulphur burner through the hopper 2. The resulting sulphur dioxide is conducted through the pipe line 3 into the apparatus 4 in which the gases are freed from dust by precipitation with an electric discharge or similar method. From the apparatus 4 the sulphur dioxide containing gas is led through the conduit 5 to a tubular cooler 6, the exterior of which tubes are cooled by water. The cool gas leaves the lower end of the cooler and then passes by means of the conduit 7 connected to the cooler and filled with Raschig rings or other suitable filling material to the wash tower 8, in which the gas is brought into contact with a high percentage sulphuric acid for the purpose of removing sulphur trioxide. The acid flows into washing tower 8 from the reservoir 9 and is kept in circulation by means of the pump 10 and conduits 11 and 12 which connect wash tower 8 and reservoir 9.

The gas freed from sulphur trioxide is conducted from the wash tower 8 at the upper end thereof by means of the conduit 13 into a tubular cooler 14 in which it is again cooled. From here passes the sulphur dioxide containing gas, partly through the circulating pipe 15 and partly through the ammonium polythionate towers 16 and 17, on whose use in the process further explanation will be given below, and in which a part of the sulphur dioxide is removed from the gas being conducted therethrough.

The wash tower 17 and the pipe line 15 are, by means of the pipe line 18, in communication with the first sulphite washer 19 and the latter by means of the pipe line 20 with the second sulphite washer 21. The sulphur dioxide containing gas is brought in contact with ammonia water in sulphite towers 19 and 21, preferably filled with special wooden tubes. The towers 19 and 21 are supplied from the reservoir 22 with ammonia water through the pipe lines 23 and 24, the pump 25 and the pipe line 26, which empties it into the top of towers 19 and 21 in the interior of the same through sprayer 27.

From the ammonia water and the sulphur dioxide there results an ammonium sulphite-bisulphite solution which is drawn off at the bottom of towers 19 and 21 and afterwards passes through cooling coil 29 into a receptacle 30, out of which it may be again conducted back as required through a pump 25 into the apparatus 27, so that the ammonium sulphite-bisulphite solution therefore as also the ammonia water flows through the towers 19 and 21 in a circuit.

The operation of the washing towers 19 and 21 is so carried out that the solution circulated contains a mixture of ammonium sulphite and bisulphite which neither exerts an ammonia nor a sulphur dioxide vapor tension. Such a solution absorbs the sulphur dioxide out of the gases completely, and a suitable composition is obtained by continuously introducing concentrated ammonia water continuously in a suitable composition. Preferably one does not exceed a content of 50% since with a higher sulphite content, the solution exhibits a marked ammonia tension, especially with highly concentrated solutions.

To the washer 21 runs that gas freed fully from sulphurous acid by the open tube 31.

The sulphite-bisulphite solution obtained in sulphite tower 21 is united with the solution prepared in tower 19 by means of pipe 24, and runs with the latter or is drawn off as a residue through the conduit 32 to a neutralizing vessel 33, to which is run ammonia water through the conduit 34 and in which the liquid is maintained in agitation by means of a propeller 35. The heat resulting in the neutralization of the ammonium bisulphite is drawn off by indirect cooling by means of a cooling coil 36 disposed in a circulating cooling medium. The cool ammonium sulphite solution is conducted through the tube 37 into the bottom of thiosulphate vessel 38, in which the ammonium sulphite under the influence of ammonium polysulphide is converted into thiosulphate. To draw off the heat which is liberated thereby the thiosulphate vessel 38 is provided with a cooling coil 39; similarly it has for agitation of the liquid a stirrer 40. In the transformation occurring in the thiosulphate vessel 38 there results as has already been mentioned, an ammonium sulphide solution which is used to convert a further quantity of ammonium sulphite into thiosulphate in such a manner that there is added to the funnel shaped conduit 41 finely divided sulphur, which dissolves in the ammonium sulphide and the thus formed ammonium polysulphide converts the sulphite into thiosulphate. The ammonium sulphide remaining undecomposed in the solution can be either used for the further treatment of thiosulphate solution or can be decomposed by adding a small quantity of sulphite-bisulphite solution out of sulphite tower 19 through the pipe line 42.

The thiosulphate solution is drawn off from the bottom of the vessel 38, conducted through a cooler 43 and then led into the reservoir 44 out of which it is forced by means of the pump 45 via conduit 46 into receiver 47, and then by means of pipe line 48 into reservoir 49. The ammonium polythionate towers are built in the same manner as towers 19 and 21. Into towers 16 and 17 the sulphurous containing gases come by means of a pump 50 through the conduits 51 and 52 in contact with the circulating thiosulphate containing solution, whereby a part of the sulphur dioxide of the gas is absorbed. The solution laden with sulphur dioxide is run or drawn off through the conduit 53 leading to the reservoir 54 in which the sulphuric acid formed in the carrying out of the process is led off out of the sulphur trioxide washing tower 8 by means of the conduit 55 from the reservoir 9.

In the ammonium polythionate receiver 54 the sulphurous acid at first only loosely combined, converts the thiosulphate into ammonium polythionate. After completion of the conversion the solution runs through the pipe 55 to the autoclaves 56 and 57 in which they are heated by the hot coil 58 to a temperature of 140° or over and the solution is converted into ammonium sulphate and free sulphur. The sulphur collecting at the bottom of the autoclave is drawn off through the pipe 59 into a car 60 in which it solidifies. A part of the resulting sulphur is conducted to the sulphur roaster 61 which is in communication with the burner gas conduit 5 by means of the pipe 62; partly it is used for obtaining ammonium polysulphide and for changing ammonium sulphite into thiosulphate.

The ammonium sulphate solution collecting above the sulphur in autoclaves 56 and 57 is led through the pipe 63 to a receiver 64, and from there through the pipe 65 to an evaporating apparatus 66 in which under diminished pressure and use of heat the solution is evaporated until crystallization begins. The salt magma prepared in evaporator 66 is forced through the salt tube 67 to a centrifuge 68 in which the salt is freed from mother liquor. The latter is led back by means of the pump 69 through the conduits 70 and 71 into ammonium sulphate solution receiver 64.

The ammonium polysulphide required for carrying out the process is produced in autoclave 72 which is provided with a hot coil 73, to which ammonia water is added through the pipe 23 connected with conduit 74, and the sulphur required is added through the inlet 75. The strong ammonium polysulphide solution is conducted through the pipe line 76 to the thiosulphate vat 38.

In Figure 2 a special apparatus for carrying out a modification of the process according to the present invention is shown. The burning of the pyrites and the course pursued by the sulphur, as well as the purification and the cooling of the gas, the preparation of ammonium polythionate solution and the ammonium sulphite solution is carried out in the same manner as described in connection with the arrangement shown in Figure 1. The same also applies to the arrangement for decomposing of the obtained ammonium polythionate solution and finally for obtaining of the solid salt and disposition of the mother liquor.

The process according to Fig. 2 distinguishes from that shown in Fig. 1 solely in that the conversion of ammonium sulphite into thiosulphate is not accomplished by means of ammonium polysulphide, but so that the sulphur is added to the thiosulphate container 38 by means of a funnel 80.

Therefore this method calls for an apparatus according to the one shown in Figure 2 in which the autoclave 72 and the conduits 74, 76 and 42 (Figure 1) are omitted.

The ammonium thiosulphate solution prepared in vat 38 out of ammonium sulphite and sulphur is led as usual through the cooler to the receiver 44 out of which it is forced by pump 45 through the pipe line 46 to the ammonium polythionate tower 17. From there it is treated in the same manner as in the apparatus according to Figure 1.

The arrangement in Figure 3 is a further modification of the process according to the present invention, in which the pyrite is burned also the disposal of the sulphur resulting in the process, and the same apparatus is used for cooling and purification of the gases as well as for decomposing the thiosulphate solution and for evaporating the ammonium sulphate solution, is the same as in Figures 1 and 2.

The process according to Figure 3 differs from the earlier described processes in that the ammonium polythionate is obtained by the addition of elemental sulphur to the liquid flowing through the wash tower and serving for the preparation of ammonium sulphite-bisulphite solution.

The sulphurous containing gases are led through the apparatus according to Figure 3 out of the last tubular cooler 14 through the conduit 81 into the wash towers 82 and 83 which are in communication with one another by means of a pipe line 84, and then by means of the pipe line 85 into the final washer 86 out of which gases just freed from sulphurous acid leave through the gas line 87. The conducting pipe 85 from the washer 83 and the connecting line between the towers 83 and 86 are connected to each other by a circuit pipe 88 which is controlled by a valve 89.

The wash tower 86 is fed with a solution of ammonium sulphite and ammonium bisulphite, which neither exhibits an ammonia nor sulphur dioxide vapor tension. This solution absorbs all of the sulphur dioxide from the burner gas. Ammonia water is led into the mass, which absorbs the sulphur dioxide, from the receiver 22 by means of the pipe line 90. The pipe line 90 discharges into an intermediary vessel 91, out of which the washing liquid by means of the pump 92 through the conduit 93 is forced into the top of the washer as in the before described arrangement. The washing liquid runs from the bottom of the tower 86 but the pipe line 95 passes through a cooler 96 and finally flows into the intermediary vessel 91.

Out of the intermediary receiver 91 the sulphite-bisulphite solution runs in the course of the process through the conduit 97 into intermediate receiver 98, while at the same time also through conduit 123 ammonia is introduced. Similarly as in the case of the washing tower 87, the liquid is forced out of the intermediate receiver 98 by means of a pump 99 through the conduit 100 to the top of the tower 83, which as in the case of the wash towers 82 and 86 it is filled with wooden tubes or such suitable filling material and the liquid in the same comes in contact with large surface contact with the gas stream led therethrough.

The washing liquid flows through the tower 83 from the upper portion to the lower portion and flows out again from the bottom of the tower through the pipe line 101 into the intermediate vessel 98. To this intermediate vessel is added simultaneously during the process finely divided sulphur through the pipe line 102, which preferably results from the pressure decomposition of the ammonium polythionate solution and which is solidified in the car 60. As in the manner of wash tower 83 and intermediate tower 98, so also do wash tower 82 and intermediate tower 103 operate. To the latter sulphur is led through the conduit 104 and sulphite-bisulphite solution through the conduit 105 from the intermediate vessel 98 and ammonia water through the conduit 106. The washing liquor is forced in the known manner by means of the pump 107 through the conduit 108 to the top of the tower where it is sprayed by sprayer 109. It flows through the washing tower 82 from the top to the bottom thereof and goes from the bottom of the wash tower through the pipe line 110 again into intermediate vessel 103. The addition of ammonia to the intermediate vessels 98 and 103 is so regulated that the washing liquor resulting in the towers 82 and 83 contains 33% ammonium sulphite and 67% ammonium bisulphite. Through the effect of simultaneous sulphur containing liquids, the liquid circulating through the towers 82 and 83 is converted into ammonium thiosulphate and ammonium polythionate. Herein a fixed heating of the liquid occurs, so that the same if necessary, by means of a cooler which may be connected to the tubes 101 and 110 respectively, it may be cooled. Out of the intermediate vessel 103 the ammonium polythionate containing liquid flows through the pipe 11 into the intermediate vessel 54 from which it is conducted directly to the decomposing autoclaves 56 and 57, in which it is converted by means of heat and pressure into ammonium sulphate and free sulphur as described in connection with Figures 1 and 2.

If the process according to the present invention should be used for the preparation of a mixture of ammonium sulphate and ammonium phosphate, then preferably either the apparatus according to Figure 1 or Figure 2 is used. In this case the ammonium polythionate towers 16 and 17 are shunted by means of a short piece of pipe 112 connected to pipes 46 and 53, and the liquid led out of the thiosulphate vessel 44 directly into reservoir 54. Simultaneously phosphoric acid solution is added to the reservoir 54 by the pipe 113. The amount of phosphoric acid led into the process can vary between ⅓ and ⅔ mols to each mol of thiosulphate used, whereby there results in the decomposing autoclaves 56 and 57, 33 to 50 mols per cent phosphate in the presence of ammonium sulphate. The phosphate is hereby chiefly in the first case mainly diammonium phosphate, in the second case mainly mono-ammonium phosphate. If the reaction is so carried out that mono-ammonium phosphate results it is advantageous to subsequently convert it into diammonium phosphate by the addition of ammonia. The temperature required for carrying out of the decomposition of the thiosulphate solution by means of phosphoric acid depends according to the amount of phosphoric acid which is used in proportion to the amount of thiosulphate, and lies between about 120 to about 220° C., whereby with greater quantities of phosphoric acid in comparison with thiosulphate a somewhat lower temperature must be used.

The principal equations in question are set out below. The first 4 concern the production of sulphite-bisulphite, thiosulphate and polythionate, the last 3 the conversions in the autoclaves.

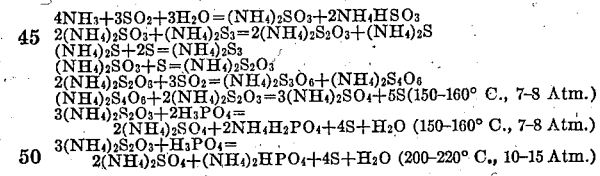

For carrying out a process according to the invention an apparatus shown in Figure 1 is operated in the following manner: There is to be produced 260 tons daily, that is 10.8 tons of ammonium sulphate hourly. For this purpose there is added to the burner 6.9 tons of pyrites containing 40% sulphur for roasting, producing altogether hourly a burner gas with a content of 7.8 tons of $SO_2$. Burner gas is freed from dust in the apparatus 4 and is cooled in cooler 6 to 40 to 50° C., then by washing with sulphuric acid of 96 to 98% strength is freed in apparatus 8 from its $SO_3$ content and finally is cooled in cooler 14 to 20 to 25° C. The amount of sulphuric acid produced hereby amounts to 0.4 ton per hour. The purified and cooled burner gas then passes to the towers 16 and 17 and is finally conducted into towers 19 and 21. To the tower 21 then runs continuously out of the reservoir 22, 1.39 tons of ammonia per hour in the form of ammonia water having a content of 14.23% $NH_3$. The ammonium sulphite-bisulphite solution produced in tower 21 is added to the tower 19 where it is converted by the sulphur dioxide into ammonium bisulphite. From the tower 21 there runs each hour 8.1 tons of ammonium bisulphite with a content of 54% $NH_4HSO_3$. The amount of sulphur dioxide absorbed in the towers 19 and 21 amounts to a total of 5.24 tons of $SO_2$.

The bisulphite solution is conducted henceforth to the neutralizing vessel 33 in which there is added to it 0.463 ton $NH_3$ each hour in the form of ammonia water from reservoir 22. Herein a part of the bisulphite is converted into neutral ammonium sulphite. The liquid then runs to the vessel 38. Herein it is converted into thiosulphate by adding 3.76 tons of an ammonium trisulphide solution which has been prepared in the autoclave 72 by heating 0.927 ton of $NH_3$ in the form of concentrated ammonia water and 2.62 tons of sulphur under pressure at a temperature of 155° C. The concentrated thiosulphate solution is cooled and forced into the receiver 44. There is produced hourly 27.41 tons of an aqueous solution of ammonium thiosulphate (44% solution). This solution is led by means of the pump 45 to the tower 17 and from there to the tower 16. In these towers the thiosulphate solution absorbs 2.6 tons of $SO_2$ from the burner gas, whereby it is partly converted into ammonium polythionate. The regulation of the sulphur dioxide addition is effected through suitable positioning of the valve 89 in the pipe line 15. The amount of solution running out of the tower 16 is approximately 30.03 tons per hour. It contains for each two mols of thiosulphate 1 mol of ammonium polythionate, a total of 14.73 tons. This solution is conducted into reservoir 54 and is led from there to the autoclaves 56 and 57. Herein it is heated up to 155° C., whereby the salts contained therein decompose into ammonium sulphate and free sulphur. The molten sulphur collects at the bottom of the autoclaves, while the sulphate solution is above it. The amount of sulphur produced per hour is 3.93 tons, the amount of sulphate solution is 26.10 tons having a content of 10.8 tons of ammonium sulphate, equal to 41.14%. The sulphur is drawn off from the autoclaves and led into the solidifying car 60. The sulphate solution runs through an intermediate vessel 64 to a vacuum evaporator 66 where it is evaporated to a solid salt. The resulting magma formed in the evaporation is hydroextracted in the centrifuge 68; the mother liquor is led back through the conduit 70 to the evaporator. The amount of salt produced as already stated above, amounts to 10.8 tons per hour.

The sulphur produced in the autoclaves is used for example to produce polysulphide in autoclave 72. The remainder is preferably burnt in the sulphur burner 61 and the resulting gases mixed with the burner gases coming from the burner 1. In the latter the amount of pyrites is dimensioned per ton of burnt sulphur to an amount equal to, in the here given example, of about 2.64 tons.

With the apparatus shown in Figure 2 for carrying out the process according to the present invention the production of thiosulphate in vessel 38 is not effected with an ammonium polysulphide solution, but there is introduced into the ammonium sulphite solution in vessel 38, 2.26 tons of pulverized sulphur at 65° C., whereby the sulphite is converted into thiosulphate. In this case therefore the autoclave 72 and its connecting pipe 74 is not used. As regards the rest of the process it is the same as described in Figure 1.

In the apparatus shown in Figure 3 for carrying out another modification of the process according to the present invention, the reaction liquid is added to the towers 82 and 83 simultaneously with ammonia and purified sulphur and both of these substances react with the sulphur dioxide with the formation of thiosulphate and ammonium polythionate. In the closed tower 86 there is as in the other modifications of the process, an ammonium sulphite-bisulphite solution prepared which has no vapor tension.

It is to be assumed that in the plant equal amounts of ammonium sulphate are prepared and accordingly equal amounts of burner gas are produced in the pyrites burner as in the case of the processes illustrated by Figures 1 and 2. Under these circumstances to the closed tower 86 there is added per hour 1.39 tons of ammonia in the form of 14.23% concentrated ammonia water, so that in tower 86, 13.23 tons of ammonium sulphite-bisulphite solution result, which have a content of 5.87 tons of salt. This solution is pumped together with 1.39 tons of ammonia in the form of 14.23% ammonia water solution to the towers 82 and 83, in which the solution has added to it about 2.18 tons of pulverized sulphur. The washing liquid is obtained in the towers 82 and 83 at a temperature of preferably 60° C. Through the towers 82 and 83 are conducted 4.34 tons of sulphurous acid, so that in the latter there results 29.56 tons of a thiosulphate-polythionate solution which contains 8.06 tons of thiosulphate and 6.20 tons trithionate, totalling therefore 14.26 tons of salt. This solution is directly decomposable and due to this fact, there can be prepared from the thiosulphate-ammonium polythionate solution, in the same manner as in the processes illustrated by Figures 2 and 3, ammonium sulphate and free sulphur. The remainder of the sulphur dioxide, equal to 3.5 tons, is led to the end tower 86 through pipe 88.

It is to be understood that the present invention is not limited to the foregoing specific details, but comprehends all modifications of the process which may reasonably fall within the scope of the appended claims.

If it is desired to produce a salt mixture containing in addition to ammonium sulphate also ammonium phosphate, the following procedure is adopted. Accordingly, to each mol thiosulphate ⅔ mol phosphoric acid are added. The apparatus shown in the Figure 2 is to be used and the procedure as already described, is adhered to. A first ammonium thiosulphate is produced at the rate of 12.11 tons hourly in the form of a 44% solution. This solution passes from the thiosulphate vessel 44 through the pipe line 46 and the connecting pipe 112 to the receiver 54. At the same time 10.68 tons of a 50% phosphoric acid solution is added from the pipe line 113.

The mixture goes forward to the autoclaves 56 and 57, where it is transformed into a solution of ammonium sulphate and monoammonium phosphate by heating up to 150-160° C. under 7 to 8 Atm. There results a solution, which contains 7.20 tons ammonium sulphate and 6.28 tons monoammonium phosphate. The weight of the solution is 34.12 tons of a salt content of 39.50%. At the same time 3.50 tons molten sulphur are produced, which is drawn off into the solidifying car 60 where it solidifies. For the production of thiosulphate 2.62 tons are added to the receiver 38 and simultaneously 0.88 ton are burned in the burner 61. At the same time 1.74 tons sulphur are burned in the roaster 1 in the form of 4.35 tons of a pyrite containing 40% sulphur. The salt solution produced goes from the autoclaves 56 and 57 in consequence of the pressure present, automatically through the pipe line 63 into the receiver 64 and is sucked through the pipe line 65 into the vacuum evaporators 66, where it is evaporated to a solid salt. The magma resulting from the evaporation is hydroextracted in the centrifuge 68, the mother liquor is led back by means of the pump 69 into the receiver 64 through the pipe lines 70 and 71. Altogether 13.48 tons salt per hour are produced from this salt solution.

I claim:

1. The process of preparing a fertilizer comprising ammonium sulphate which comprises reacting sulphurous acid and ammonia to form an ammonium sulphite-ammonium bisulphite mixture, reacting on the said sulphite mixture with an ammonia-sulphur composition whereby ammonium thiosulphate is formed, reacting on the said ammonium thiosulphate with an acid, and decomposing the reaction product at an elevated temperature and under pressure to form a fertilizer comprising ammonium sulphate, the reaction to form thiosulphate from the sulphite-bisulphite being effected subsequently to and in a separate step from the reaction step to form the sulphite-bisulphite and prior to and separately from the heating step to form ammonium sulphate.

2. The process of preparing a fertilizer comprising ammonium sulphate which comprises reacting sulphurous acid and ammonia to form an ammonium sulphite-ammonium bisulphite mixture, reacting on the said sulphite mixture with ammonium polysulphide whereby ammonium thiosulphate is formed, reacting on the said ammonium thiosulphate with sulphurous acid whereby it is at least partly converted into ammonium polythionate, and decomposing the said ammonium polythionate at an elevated temperature and under pressure to form ammonium sulphate and sulphur, the reaction to form thiosulphate from the sulphite-bisulphite being effected subsequently to and in a separate step from the reaction step to form the sulphite-bisulphite and prior to and separately from the heating step to form ammonium sulphate.

3. The process of preparing a fertilizer comprising ammonium sulphate and ammonium phosphate which comprises reacting sulphurous acid and ammonia to form an ammonium sulphite-ammonium bisulphite mixture, reacting on the said sulphite mixture with ammonium polysulphide whereby ammonium thiosulphate is formed, reacting on the said ammonium thiosulphate with phosphoric acid and decomposing the reaction product at an elevated temperature and under pressure to form a fertilizer comprising ammonium sulphate and ammonium phosphate, the reaction to form thiosulphate from the sulphite-bisulphite being effected subsequently to and in a separate step from the reaction step to form the sulphite-bisulphite and prior to and separately from the heating step to form ammonium sulphate.

4. In the process set forth in claim 2, the steps of reacting a part of the sulphur formed by the decomposition of the ammonium polythionate, with ammonia under the influence of heat and pressure to form ammonium polysulphide, and burning another portion of the said sulphur to form sulphur dioxide.

5. A process as set forth in claim 3 in which an ammonia water is used in the reaction between sulphurous acid and ammonia which contains approximately 18% ammonia, and in which the sulphite-bisulphite solution has a sulphite content of about 50%.

6. A process of preparing ammonium sulphate comprising, reacting sulphurous acid and ammonia to form an ammonium sulphite-ammonium bisulphite mixture, reacting on the said sulphite mixture with ammonia and sulphur, whereby thiosulphate is formed, and reacting on the said thiosulphate with sulphurous acid whereby it is wholly or partly converted into ammonium polythionate, the above steps being carried out in separate steps and the heat evolved in each step being separately controlled, the reaction step to form the thiosulphate being effected subsequently to and in a separate step from the reaction step to form sulphite-bisulphite and prior to and separately from the heating to ammonium sulphate in which the union between $NH_3$, $SO_2$ and sulphur used is so carried out that the $NH_3$ and the $SO_2$ are brought together in the proportion of 4 mols. $NH_3$ and 3 mols. $SO_2$ and to this mixture at least 5 atoms of sulphur are added.

7. A process for preparing ammonium sulphate which comprises reacting sulphurous acid and ammonia to form an ammonium sulphite-ammonium bisulphite mixture, reacting on the said sulphite mixture with ammonia and sulphur whereby ammonium thiosulphate is formed, reacting on the said thiosulphate with sulphurous acid whereby ammonium polythionate is formed, heating the said ammonium polythionate under pressure whereby ammonium sulphate and free sulphur are formed, cooling the solutions formed by the various reactions so that the temperature of the solutions in the respective reaction steps is maintained below 60° C., except in the final decomposition of the polythionate, separating the sulphur formed in the decomposition of the polythionate solution and returning the same to the sulphite-bisulphite, thiosulphate, and polythionate forming steps evaporating the ammonium sulphate solution and recovering the product, the reaction to form thiosulphate from the sulphite-bisulphite being effected subsequently to and in a separate step from the reaction to form the sulphite-bisulphite and prior to and separately from the heating to ammonium sulphate.

8. The process of preparing a fertilizer comprising ammonium sulphate, which comprises reacting sulphurous acid and ammonia to form an ammonium sulphite-ammonium bisulphite mixture, reacting on the said sulphite mixture with ammonium polysulphide, whereby ammonium thiosulphate is formed, reacting on the said ammonium thiosulphate with an acid material selected from the herein described group consisting of sulphurous acid and phosphoric acid, and decomposing the reaction product at an elevated temperature and under pressure to form sulphur and a fertilizer comprising ammonium sulphate, the reaction to form thiosulphate from the sulphite-bisulphite being effected subsequently to and in a separate step from the reaction step to form the sulphite-bisulphite and prior to and separately from the heating step to form ammonium sulphate.

CHRISTIAN JOHANNES HANSEN.